United States Patent [19]
Baum et al.

[11] Patent Number: 5,662,206
[45] Date of Patent: Sep. 2, 1997

[54] APPARATUS FOR SORTING CONVEYOR WITH A TILTABLE SUPPORTING TRAY

[75] Inventors: Ingolf Baum, Dietzenbach; Heinrich Droste, Babenhausen; Holger Humburg, Hanau, all of Germany

[73] Assignee: Mannesmann Aktiengesellschaft, Dusseldorf, Germany

[21] Appl. No.: 577,872

[22] Filed: Dec. 22, 1995

[30] Foreign Application Priority Data

Dec. 23, 1994 [DE] Germany .............. 44 47 396.6

[51] Int. Cl.⁶ .................................................. B65G 47/52
[52] U.S. Cl. ........................................................ 198/370.04
[58] Field of Search ................ 198/370.01, 370.03, 198/370.04

[56] References Cited

U.S. PATENT DOCUMENTS

| | | | |
|---|---|---|---|
| 3,669,245 | 6/1972 | Wooten et al. | 198/370.04 |
| 4,846,335 | 7/1989 | Hartlepp | 198/370.04 |
| 4,856,642 | 8/1989 | Nicholson et al. | 198/370.04 |

FOREIGN PATENT DOCUMENTS

| | | |
|---|---|---|
| 0173399 | 3/1986 | European Pat. Off. . |
| 2943516 | 5/1980 | Germany . |
| 3228272 | 12/1983 | Germany . |
| 4090308 | 3/1992 | Germany . |
| 4133953 | 4/1993 | Germany . |

*Primary Examiner*—James R. Bidwell
*Attorney, Agent, or Firm*—Cohen, Pontani, Lieberman & Pavane

[57] ABSTRACT

A sorting conveyor with a tiltable supporting tray which is swivelable from a horizontal transporting position to a position at an angle to the horizontal by a tilting movement about a tilting axle extending in the transposing direction. The supporting tray is swivelable by means of a tipping mechanism arranged on a driven car, the car being used to deliver transported goods which are loaded at a pick-up station. The swiveling of the supporting tray and a stopping process can be initiated via stationary cam rails. To achieve a simple, economical tipping mechanism with fast switching between horizontal and tipped positions, the supporting tray is fastened at a pendulum which is swivelable about the tilting axle which is stationary with respect to the car. A free end of the pendulum is articulated at a slide which is guided in a base body transversely to the transporting direction by means of a pendulum joint. Switching rockers are supported at the slide so as to be rotatable to the left and to the right of the transporting direction and are provided with switching rollers which engage in stationary switch pieces during the transporting movement. After being actuated by stationary switching elements, the tipping movement of the supporting tray is controllable by the cam shape of the switch pieces.

14 Claims, 6 Drawing Sheets

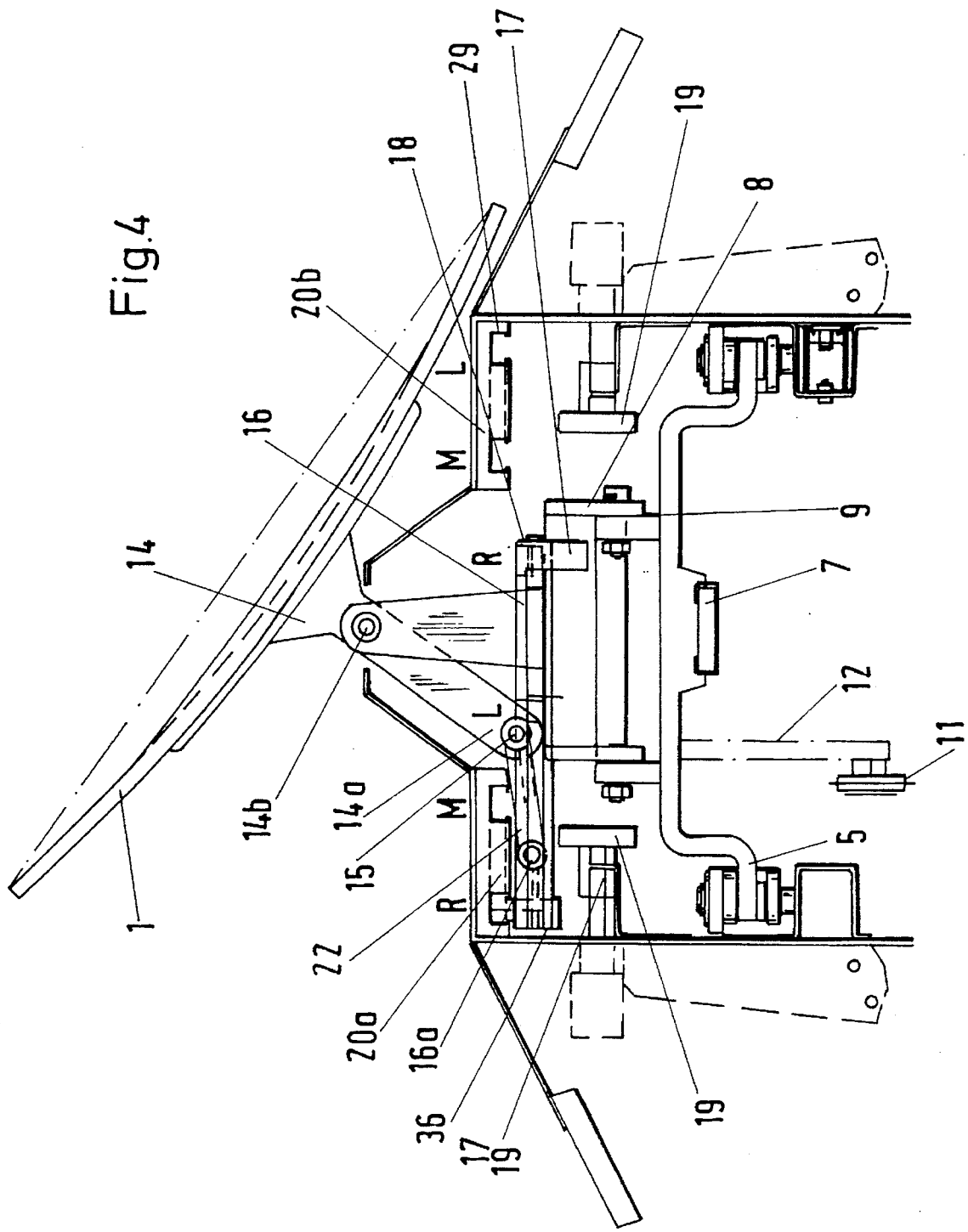

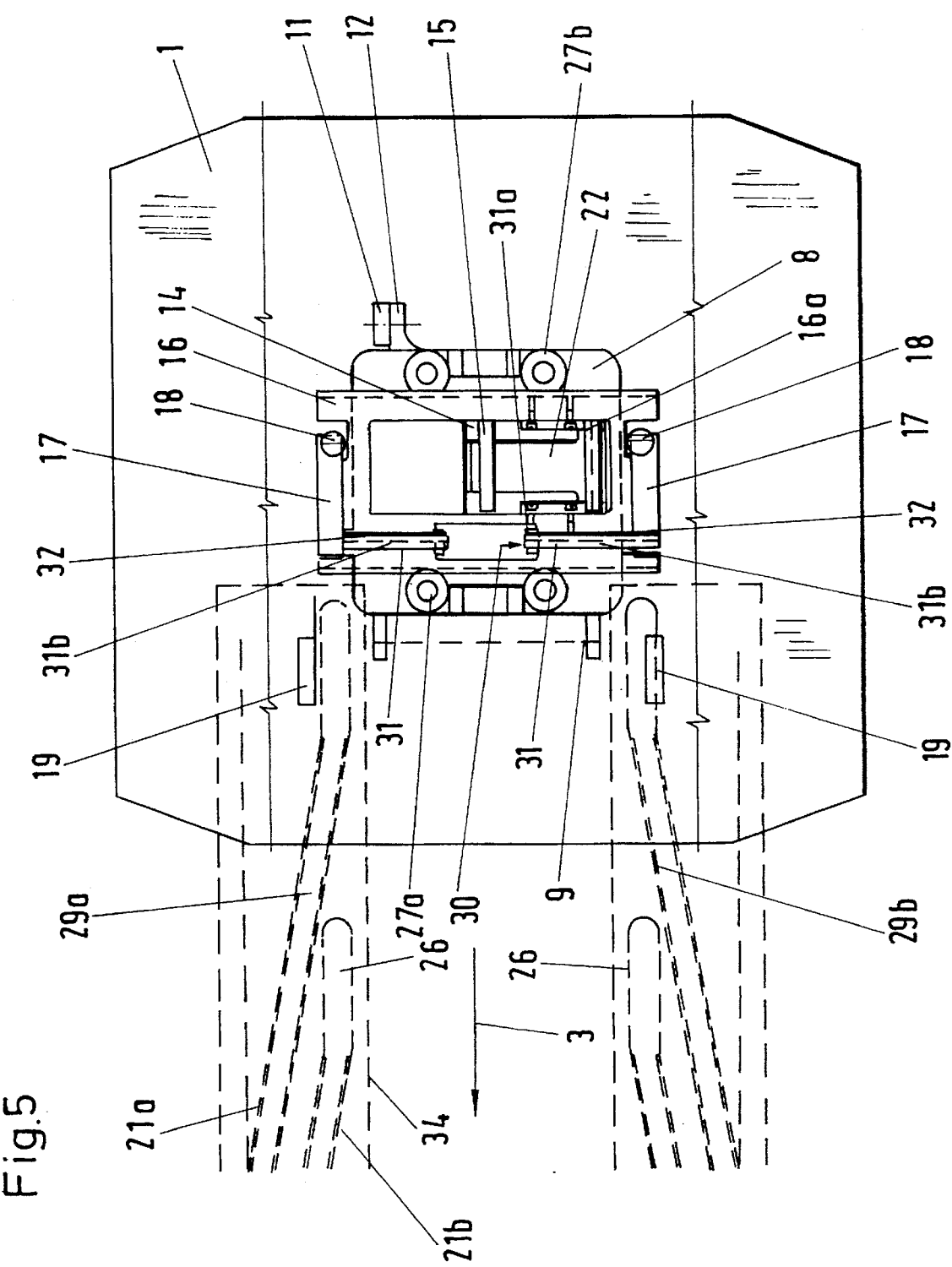

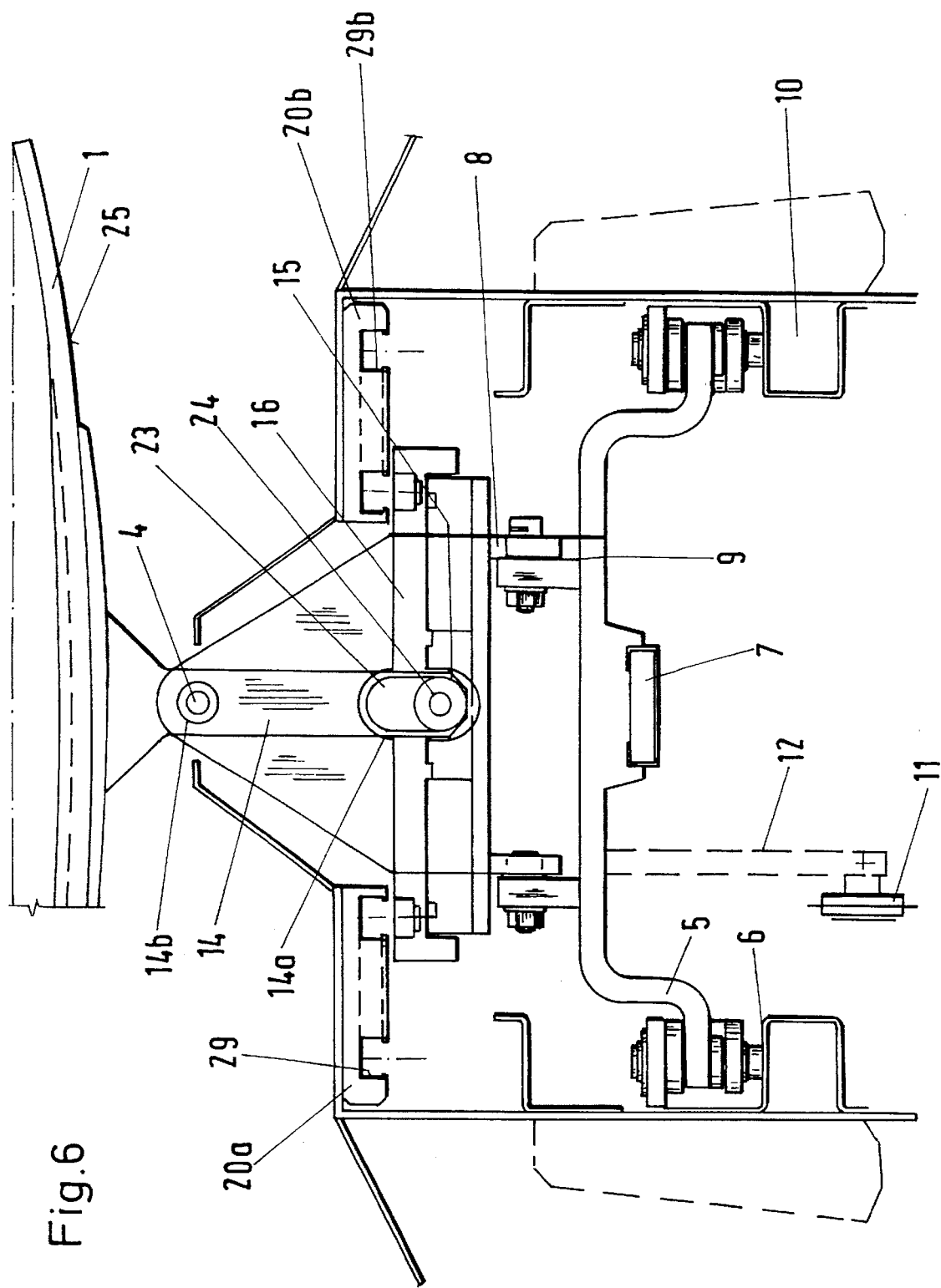

5,662,206

APPARATUS FOR SORTING CONVEYOR WITH A TILTABLE SUPPORTING TRAY

BACKGROUND OF THE INVENTION

1. Field of the Invention

The invention relates to a sorting conveyor, and more particularly, to a sorting conveyor with a tiltable supporting tray. The supporting tray is swivelable from a horizontal transporting position to a position at an angle to the horizontal by a tilting or swiveling movement about a tilting axle extending in the transporting direction. The supporting tray is swivelable by means of a tipping mechanism arranged on a driven car, the car being used to deliver transported goods which are loaded at a pick-up station to a preselected location. The swiveling of the supporting tray and a stopping process can be initiated via stationary cam rails.

2. Description of the Related Art

A sorting conveyor of this type is disclosed in German Patent Application Number DE 40 90 308 T1. This sorting conveyor enables tilting of the supporting tray by pulling a special cam follower roller first outward and then downward. When pulled outward, the rollers move outward into guide portions in the vicinity of the upper end of the lower guide portions. This roller movement is accompanied by a corresponding swiveling movement of an arm so that when these rollers are guided along the guide portions they enable a downward movement of the arm which tilts the tilting body and its supporting tray. During this tilting, other rollers move upward along the opposite arm from upper tracks. In so doing, this opposite arm is held inward in a substantially unchanged angular position ensuring that the rollers move back into the initial position during the subsequent return movement of the trays. Although sliding in corresponding cam guides on a plane vertical to the transporting direction, the rollers encounter a high resistance when pulled outward caused by the corresponding roller at the opposite arm pulling inward in opposition. Therefore, the friction resistance is correspondingly great and the rollers and arms are highly stressed to a corresponding extent. For this reason, this known solution can be used at best for transporting smaller goods whose weight does not exceed a few kilos.

SUMMARY OF THE INVENTION

It is accordingly an object of the present invention to provide a sorting conveyor device with a tiltable supporting tray which switches from a horizontal position to a tilted position easily, quickly and without substantial loading in a more economical construction than is currently known.

This object is achieved by fastening the supporting tray of a sorting conveyor to a pendulum which is swivelable about a tilting axle which, in turn, is stationary with respect to a driven car. A free end of the pendulum is articulated at a slide which is guided in a base body transversely to the transporting direction of the conveyor by means of a pendulum joint. Switching rockers are supported at the slide so as to be rotatable to the left and to the right of the transporting direction and are provided with switching rollers which engage stationary switch pieces during the transporting movement. Stationary switching elements activate the tipping movement of the supporting tray, this movement thereafter being controllable by the cam shape of the stationary switch pieces. The tilting function as well as a stopping function can be advantageously carried out by means of the slide. Further, the tilting path is advantageously adjusted with respect to acceleration and delay via the cam shape of the stationary switch pieces depending on the respective transported goods. Moreover, it is advantageous that such cam shapes can be arranged at short intervals one after the other so that short cars with correspondingly short supporting trays can be provided.

A further object of the invention is to provide a pendulum joint formed from an articulable link at the free end of the pendulum and at the slide. This provides for the circular-arc motion of the pendulum. In an alternate embodiment, the link can be dispensed with when the pendulum joint is formed of the combination of an elongated-hole guide arranged in a region of the free end of the pendulum and a roller which is rotatably supported at the slide and which engages in the elongated-hole guide.

An even further object of this invention is to provide that the tilting movement and stopping function are such that the transported goods are thrown off toward the left via a stationary right-hand cam rail and are thrown off toward the right via a stationary left-hand cam rail, as viewed in the transporting direction.

A yet further object of this invention is to provide that the supporting tray can be stopped at least in a center position.

A still further object of this invention is to provide that the tipping process can be initiated quickly since the left-hand and right-hand switch pieces respectively have a cam portion which is initially straight and then extends outward.

A further object of the invention is to provide a slide that is arranged on a base body which is swivelable about a tilting joint extending transversely to the transporting direction and which is supported between roller guides and/or sliding guides arranged in pairs. In order to reduce friction the roller guides are advantageously formed of rolling bearing rings.

An even further object of the invention is to provide for reliable guiding during the tilting process. To this end, the switching rockers with the switching rollers can be guided into a cam groove of the switch piece. The cam groove is undercut at least on one side to form a groove profile. The switching roller is accordingly held within the cam groove in a compulsory manner so as to prevent it from slipping out.

A yet further object of this invention is to provide stop faces which cooperate with the base body and are advantageously arranged at the slide.

A still further object of the invention is to provide switching rockers that are secured on a rotatable switching shaft carrying a stopping cam at one end. This cam stops the supporting tray relative to the base body when one of the switching rollers engages in the cam groove.

In a preferred embodiment, two stopping cams cooperate with four stop faces at the base body. The two stopping cams make contact respectively with two projecting stop faces and two set back stop faces.

A further object of the invention is to provide that the switching rocker is damped for high switching speeds by means of a buffer. Such a buffer can be made of, for example polyamide plastic, and damping can be achieved by way of the flexing or bending movement of such plastic.

A further object of this invention is to provide switching rockers which are swivelable about a switching shaft axis, i.e. which can be actuated when the switching elements are pushed into the movement path. For this purpose, the switching rockers can be constructed in a cam profile so that high speed switching can be initiated relatively quickly but gently.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings in which like numerals are used to denote similar elements:

FIG. 4 is another front view of the car as shown in FIG. 3, but with the supporting tray in a tilted position;

FIG. 5 is a top view of the car in FIG. 2 with the supporting tray partially cut away to show the slide;

FIG. 6 shows a front view of the car in FIG. 2 with an alternative form of pendulum joint at the pendulum.

DETAILED DESCRIPTION OF THE PRESENTLY PREFERRED EMBODIMENTS

Figure 1:
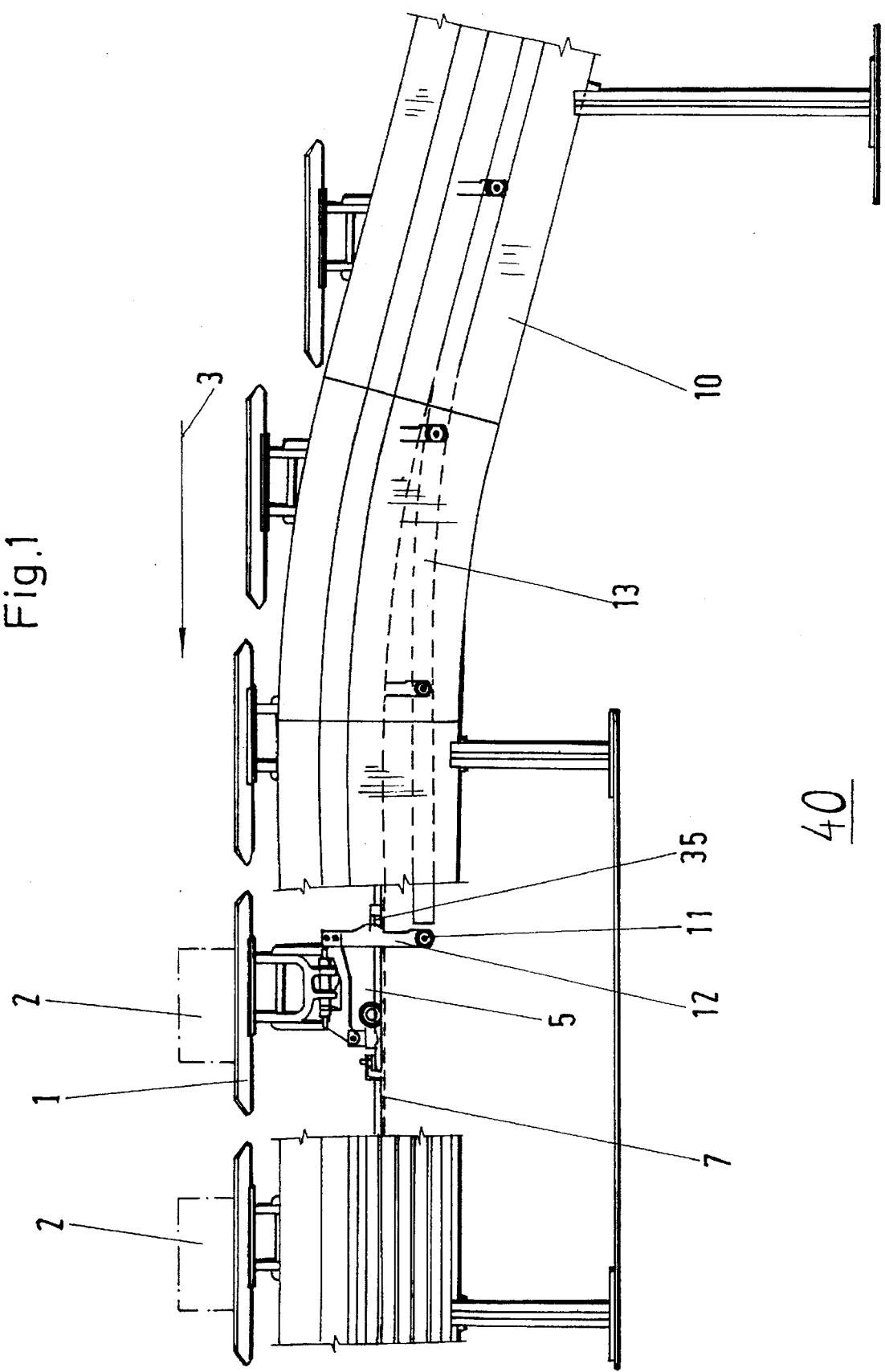
FIG. 1 is a side view of a sorting conveyor according to the present invention arranged with a plurality of cars which are connected to one another via chain links and which move in a circular path.

Referring now to the drawings in detail, a sorting conveyor constructed in accordance with the present invention is labelled with the general numeral 40 and is especially useful as a sorting conveyor with a series or plurality of tiltable supporting trays.

The apparatus is designed for a sorting conveyor 40 with a series of tiltable supporting trays 1 each of which are swivelable from a horizontal transporting position to a tilted discharge position by a tilting movement about a tilting axle 4 carried by a driven car 5, the tilting axles extending in a transporting direction 3. A tipping mechanism arranged on the driven cars 5 provides the tilting movement of the supporting trays 1, with the cars 5 being used to deliver transported goods 2 which are loaded at a pick-up station. The swiveling of the respective supporting trays 1 and a stopping process can be initiated via stationary cam rails 6.

A chain link 7 or other connecting means moves along with a base body 8 which is attached via a tilting joint 9. A guide belt 10 has ascending and descending portions which can be overcome to maintain the supporting trays 1 horizontal. This effect is achieved by the base body 8 engaging with a vertical guide 13 in ascending and descending portions of the guide belt 10 by means of a riser 12 and a riser roller 11 secured to the riser 12 in order to keep the tilting joint 9 horizontal.

The supporting tray 1 is fastened at the upper end of a pendulum 14, the pendulum 14 being rotatable about a pendulum axle 14b and swivelable about the tilting axle 4 which is stationary with respect to the car 5. A free end 14a of the pendulum 14 (FIG. 3) is articulated at a slide 16 which is guided in the base body 8 transversely to the transporting direction 3 by means of a pendulum joint 15. Switching rockers 17, which are supported at the slide 16 so as to be rotatable to the left and to the right of the transporting direction 3, are provided with switching rollers 18. The switching rockers 17 are actuated by stationary switching elements 19 and thereafter, the switching rollers 18 engage in stationary switch pieces 20a, 20b during the transporting movement. These stationary switch pieces 20a, 20b form the cam rails 6. The tipping movement of the supporting tray 1 is controllable by means of the cam shape of the cam rails 6.

Figure 3:
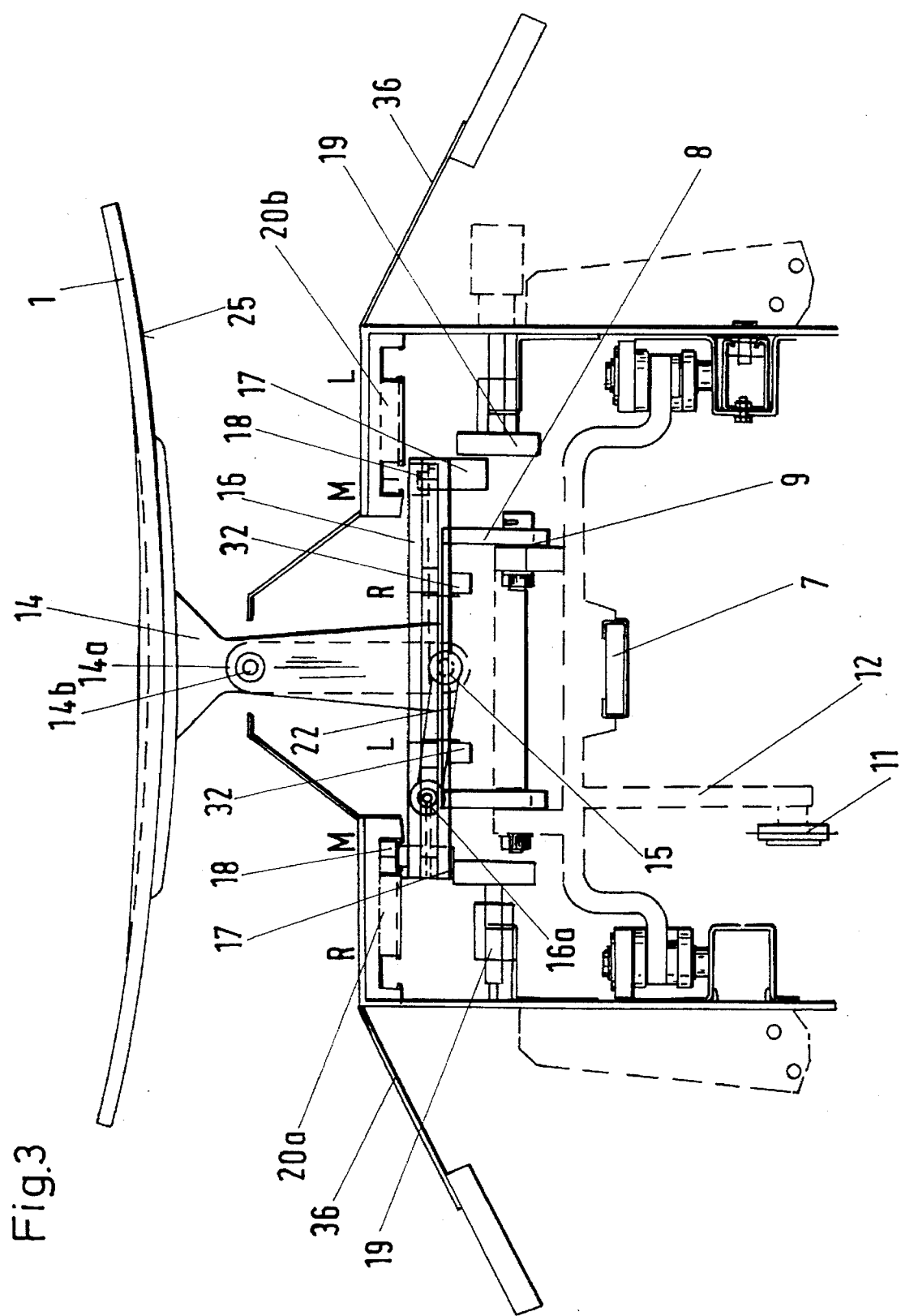
FIG. 3 is a front view of the car of FIG. 2 with a supporting tray and a tipping mechanism in the form of a slide.

As is shown in FIG. 3, the pendulum joint 15 is formed by means of a rocker or link 22 which is articulated at the free end 14a of the pendulum 14 and at the slide 16.

According to an alternative embodiment shown in FIG. 6, the pendulum joint 15 is formed of an elongated-hole guide 23 arranged in a region of the free end 14a of the pendulum 14 and a roller 24 which is rotatably supported at the slide 16 and which engages in the elongated-hole guide 23.

In FIGS. 1, 2, 3, 5 and 6, the supporting tray 1 is shown in its center position 25.

As viewed in the transporting direction 3, the transported goods 2 are thrown off toward the left via a stationary right-hand cam rail 21a and are thrown off toward the right via a stationary left-hand cam rail 21b (FIG. 5).

As shown in FIG. 5, the left-hand and right-hand stationary switch pieces 20a and 20b respectively have a cam portion 26 which is initially straight and then extends outward. Ultimately, this arrangement allows for a close sequence of cars because the cam rails 21a and 21b can be slid into one another as is shown, so that the straight cam portion 26 does not interfere with the course of the adjacent cam rail. Therefore, a switch piece 20a, 20b of this type can have a plurality of such cam portions 26.

Further, the slide 16 is arranged on the base body 8 which is swivelable about the tilting joint 9 which extends transversely to the transporting direction 3. The slide 16 is further supported between roller or sliding guides 27a, 27b arranged in pairs. In a preferred embodiment, the roller guides 27a, 27b may be and preferably are formed of rolling bearing rings 28 as is shown in FIG. 5.

The switching rockers 17 along with the switching rollers 18 can be guided into cam grooves 29a, 29b of the switch pieces 20a, 20b. The cam grooves 29a, 29b are each undercut at least on one side to form a T-shaped groove profile 29 (FIG. 4). As can be seen in FIG. 5, the T-shape of the groove profile 29 (See FIG. 4) is not yet present in the straight cam portions 26, but only begin in the cam rails 21a, 21b.

Further, stopping means 30 which cooperates with the base body 8 is arranged at the slide 16. For this purpose, the switching rockers 17 are secured on a rotatable switching shaft 31 carrying a stopping cam 32 at one end 31a which stops the supporting tray 1 relative to the base body 8 when one of the switching rollers 18 engages in the earn groove 29a, 29b. The switching rocker 17 can be damped for high switching speeds by means of a buffer.

Figure 2:
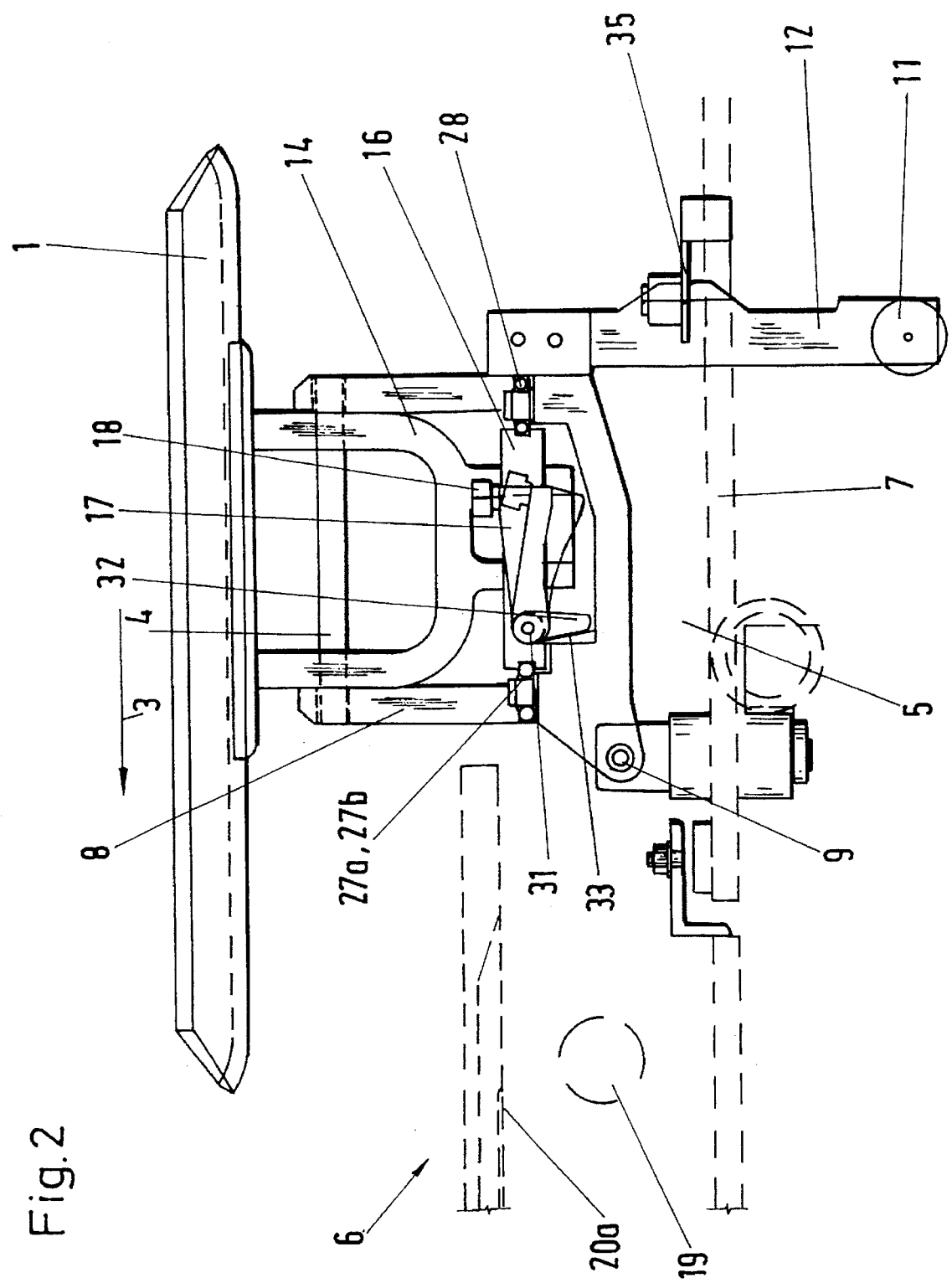
FIG. 2 is an enlarged side view of one of the cars in FIG. 1.

In the embodiment shown in FIG. 2, two stopping cams 32 cooperate with four stop faces 33 at the base body 8. The switching rockers 17 can be actuated by means of the switching elements 19 which can be pushed into the movement path 34, i.e., which are swivelable about a switching shaft axis 31b (FIG. 5).

In operation for right-hand tilting, the switching element 19 which is arranged laterally at the movement path 34 is pushed inward by means of, for example an electromagnetic drive, a hydraulic drive, or a pneumatic drive. The switching rocker 17 fastened to the slide 16 is pressed up by the switching element 19 which comprises a release roller. As a result, the switching roller 18 engages the switch piece 20a fastened at the guide belt 10. The stopping cam 32 simultaneously rotates out of engagement with the base body 8 via the switching shaft 31 and a movement which is determined by the shape of the T-groove in the switch piece 20a is described outward transversely to the transporting direction 3.

This movement is transmitted from the switching roller 18 to the slide 16 via the switching rocker 17, switching shaft 31, and the stopping cam 32. The pendulum 14 is accordingly rotated about the pendulum axle 14b by the slide 16 via the slide joint 16a, the link 22 and the pendulum joint 15 so that the supporting tray 1 tilts toward the desired side.

To the extent that the switching roller 18 is pressed out of a cam groove 29a, 29b of the switch pieces 20a, 20b (depending upon whether right- or left-hand tilting is desired), the stopping cam 32 also rotates and is set against the outside of the base body 8 so that the tilted position is secured by the two stopping cams 32 against the base body 8.

Alignment of the supporting tray 1 is effected in a manner analogous to the tilting process. The switching rollers 18 are brought into engagement with the cam grooves 29a, 29b of the switch pieces 20a, 20b in that the switching rocker 17 is lifted. In so doing, the stopping cam 32 is also disengaged from the base body 8 by the switching shaft 31.

The slide 16 is pushed into the center position again by the shape of the cam grooves 29a, 29b of the switch pieces 20a, 20b and the supporting tray 1 is safely stopped in the horizontal transporting state after successful engagement of the stopping cam 32.

The horizontal position of the supporting tray 1 (FIG. 2) is also secured by tilt locking means 35. The transported goods 2 can be slid off to the left or to the right, according to the tilting position of the supporting tray 1, via a chute 36 (FIG. 3).

The invention is not limited by the embodiments described above which are presented as examples only but can be modified in various ways within the scope of protection defined by the appended patent claims.

What is claimed is:

1. A sorting conveyor of the type having a tiltable tray which moves in a transporting direction and which is tilted at a preselected location for discharging an item on said tray, said sorting conveyor comprising:

a supporting tray;

a driven car for carrying said supporting tray in said transporting direction;

a pendulum fastened to said supporting tray, said pendulum having a free end;

a slide, a joint for articulably mounting said free end of said pendulum at said slide;

a base body, said slide being slidably mounted on said base body for movement transverse of said base body in response to movement of said base body in said transporting direction;

a tilting axle operatively mounted on said driven car, said tilting axle being stationary with respect to said car, said pendulum being swivelably mounted on said tilting axle;

a plurality of stationary switching elements fixedly mounted at said preselected location;

a plurality of switching rockers supportable at said slide, said switching rockers being rotatable to the left and to the right of said transporting direction, said switching rockers being connected to said switching elements and being actuatable thereby;

a plurality of switching rollers operatively connected to said switching rockers; and a plurality of stationary switch pieces with which said switching rollers are engagable for tilting said tray, said switch pieces being substantially cam-shaped.

2. The apparatus as defined in claim 1, wherein said joint further comprises an articulable link between said free end of said pendulum and said slide.

3. The apparatus as defined in claim 1, wherein said free end of said pendulum has an elongated-hole therein and wherein said joint comprises a roller rotatably supported on said slide, said roller being engagable in said elongated-hole.

4. The apparatus as defined in claim 1, wherein said stationary switch pieces further comprise a plurality of stationary cam rails.

5. The apparatus as defined in claim 1, wherein said supporting tray is stoppable at least in a center position.

6. The apparatus as defined in claim 1, wherein said stationary switch pieces have cam portions which have a first part which is substantially parallel to said transporting direction and a second part which extends outwardly of said transporting direction.

7. The apparatus as defined in claim 1, wherein said slide further comprises:

a tilting joint about which said base body is swivelable, said tilting joint extending transversely of said transporting direction; and a plurality of roller guides arranged in pairs, said base body being disposed between said pairs of roller guides.

8. The apparatus as defined in claim 7, wherein said roller guides are formed of rolling bearing rings.

9. The apparatus as defined in claim 1, wherein each of said stationary switch pieces is provided with a cam groove which is undercut on at least one side, said switching rollers being guidably disposed in said cam grooves, said grooves being profiled for holding said switching rollers within said cam grooves.

10. The apparatus as defined in claim 1 further comprising means for stopping said supporting tray relative to said base body, said means being operatively mounted to said slide.

11. The apparatus as defined in claim 10, wherein said stopping means comprises:

a rotatable switching shaft, said switching rockers secured to said switching shaft, said switching shaft having a first end; and a stopping cam operatively connected to said first end of said rotatable switching shaft, said means for stopping said tray including said stopping cam, said stopping means stopping said supporting tray relative to said base body when one of said switching rollers engages said cam groove.

12. The apparatus as defined in claim 1, wherein said switching rocker further comprises a buffer means for damping said switching rocker at high switching speeds.

13. The apparatus as defined in claim 1, further comprising:

a plurality of stopping cams operatively connected to said slide; and a plurality of stop faces connected to said base body, said stopping cams being stoppable by said stop faces.

14. The apparatus as defined in claim 1, further comprising a rotatable switching shaft having an axis, said switching elements being swivelable about said switching shaft axis.

* * * * *